(12) United States Patent
Tuhy

(10) Patent No.: US 7,552,785 B2
(45) Date of Patent: Jun. 30, 2009

(54) SUSPENSION SYSTEM FOR TRACK VEHICLE

(75) Inventor: Lance S. Tuhy, Fargo, ND (US)

(73) Assignee: Clark Equipment Company, West Fargo, ND (US)

( * ) Notice: Subject to any disclaimer, the term of this patent is extended or adjusted under 35 U.S.C. 154(b) by 172 days.

(21) Appl. No.: 11/555,794

(22) Filed: Nov. 2, 2006

(65) Prior Publication Data

US 2008/0105472 A1    May 8, 2008

(51) Int. Cl.
  *B62D 55/104*  (2006.01)
  *B62D 55/065*  (2006.01)
(52) U.S. Cl. .................. 180/9.58; 180/9.5; 305/132; 305/133; 305/129
(58) Field of Classification Search .................. 180/9.5, 180/9.58, 193; 305/132, 129, 133
See application file for complete search history.

(56) References Cited

U.S. PATENT DOCUMENTS

| | | | |
|---|---|---|---|
| 1,399,370 A | | 12/1921 | White |
| 1,442,570 A | | 1/1923 | Holt |
| 1,443,556 A | * | 1/1923 | Beal et al. .................. 305/132 |
| 2,019,654 A | * | 11/1935 | Valentine .................. 305/132 |
| 2,338,436 A | | 1/1944 | Jirsak et al. |
| 2,459,975 A | | 1/1949 | Sweenes et al. |
| 2,592,541 A | | 4/1952 | Curtis |
| 2,599,233 A | | 6/1952 | Christie |
| 2,659,596 A | | 11/1953 | Keysor |
| 2,786,724 A | | 3/1957 | Armington et al. |
| 2,789,438 A | | 4/1957 | Hutchinson |
| 2,833,361 A | | 5/1958 | Schwartz |
| 2,864,452 A | | 12/1958 | Guntert et al. |
| 3,096,840 A | | 7/1963 | Mazzarins |
| 3,117,647 A | | 1/1964 | Polko |
| 3,275,387 A | | 9/1966 | Hedges |
| 3,313,167 A | | 4/1967 | Wiese |
| 3,451,728 A | | 6/1969 | Bruneau |
| 3,472,563 A | | 10/1969 | Irgens |
| 3,575,474 A | | 4/1971 | Russ, Sr. |
| 3,630,581 A | | 12/1971 | Gostomski |

(Continued)

FOREIGN PATENT DOCUMENTS

GB         770502        3/1957

(Continued)

OTHER PUBLICATIONS

Search Report and Written Opinion dated Apr. 10, 2008 for International application No. PCT/US07/83101.

*Primary Examiner*—Tony H. Winner
(74) *Attorney, Agent, or Firm*—John D. Veldhuis-Kroeze; Westman, Champlin & Kelly, P.A.

(57) ABSTRACT

A suspension system for a track vehicle, the suspension system comprising: a frame; a track surrounding the frame; a plurality of suspension modules resiliently interconnected between the frame and track to bias the track into engagement with a ground surface upon which the track vehicle sits; and at least one idler over which the track extends. Under a normal load, all weight of the track vehicle is borne by the suspension modules and not by the at least one idler. Under selected conditions the at least one idler bears at least some weight of the track vehicle to rigidify the track vehicle suspension during such selected conditions.

16 Claims, 8 Drawing Sheets

U.S. PATENT DOCUMENTS

| | | |
|---|---|---|
| 3,664,449 A | 5/1972 | Vardell |
| 3,688,858 A | 9/1972 | Jespersen |
| 3,722,962 A | 3/1973 | Cooper |
| 3,774,708 A | 11/1973 | Purcell et al. |
| 3,826,325 A | 7/1974 | Purcell et al. |
| 3,840,082 A | 10/1974 | Olson |
| 3,853,016 A | 12/1974 | Lane, III et al. |
| 3,888,132 A | 6/1975 | Russ, Sr. |
| 3,948,110 A | 4/1976 | Lassanske |
| 3,948,572 A | 4/1976 | Korner et al. |
| 4,072,062 A | 2/1978 | Morling et al. |
| 4,147,218 A | 4/1979 | Stedman |
| 4,218,932 A | 8/1980 | McComber |
| 4,415,055 A | 11/1983 | Ahn |
| 4,431,073 A | 2/1984 | Nagao et al. |
| 4,437,528 A | 3/1984 | Koehler et al. |
| 4,501,452 A * | 2/1985 | Huang .................. 305/132 |
| 4,572,311 A | 2/1986 | Oswald et al. |
| 4,739,852 A | 4/1988 | Stevens et al. |
| 4,805,388 A | 2/1989 | Kell |
| 4,825,969 A | 5/1989 | King et al. |
| 4,836,318 A | 6/1989 | Tonsor et al. |
| 4,846,092 A | 7/1989 | Wilson |
| 4,881,609 A | 11/1989 | Purcell et al. |
| 4,962,821 A | 10/1990 | Kim |
| 5,005,921 A | 4/1991 | Edwards et al. |
| 5,005,922 A | 4/1991 | Edwards et al. |
| 5,131,484 A | 7/1992 | Carra et al. |
| 5,171,074 A | 12/1992 | Seksaria et al. |
| 5,183,287 A | 2/1993 | VanSweden |
| 5,190,363 A | 3/1993 | Brittain et al. |
| 5,279,378 A | 1/1994 | Grawey et al. |
| 5,320,585 A | 6/1994 | Kato |
| 5,343,960 A | 9/1994 | Gilbert |
| 5,358,064 A | 10/1994 | Oertley |
| 5,363,936 A | 11/1994 | Grawey et al. |
| 5,373,909 A | 12/1994 | Dow et al. |
| 5,409,305 A | 4/1995 | Nagorcka |
| 5,447,365 A | 9/1995 | Muramatsu et al. |
| 5,466,056 A | 11/1995 | James et al. |
| 5,472,563 A | 12/1995 | Kogawa et al. |
| 5,484,321 A | 1/1996 | Ishimoto |
| 5,505,274 A | 4/1996 | Satzler |
| 5,533,587 A | 7/1996 | Dow et al. |
| 5,533,796 A | 7/1996 | Beeley |
| 5,540,489 A | 7/1996 | Muramatsu et al. |
| 5,622,234 A | 4/1997 | Nagorcka et al. |
| 5,676,436 A | 10/1997 | Hart |
| 5,707,123 A | 1/1998 | Grob |
| 5,722,745 A | 3/1998 | Courtemanche et al. |
| 5,752,574 A | 5/1998 | Oertley |
| 5,769,512 A | 6/1998 | Kautsch |
| 5,791,429 A | 8/1998 | Bergman |
| 5,839,802 A | 11/1998 | Sheets |
| 5,853,233 A | 12/1998 | Turner |
| 5,899,164 A | 5/1999 | Coast |
| 5,899,541 A | 5/1999 | Ying et al. |
| 5,984,438 A | 11/1999 | Tsunoda et al. |
| 5,997,109 A | 12/1999 | Kautsch |
| 6,012,784 A | 1/2000 | Oertley |
| 6,065,818 A | 5/2000 | Fischer |
| 6,074,025 A | 6/2000 | Juncker et al. |
| 6,076,901 A | 6/2000 | Rankin et al. |
| 6,120,405 A | 9/2000 | Oertley et al. |
| 6,123,399 A | 9/2000 | Snyder |
| 6,135,220 A | 10/2000 | Gleasman et al. |
| 6,139,121 A | 10/2000 | Muramatsu |
| 6,203,127 B1 | 3/2001 | Chapman |
| 6,220,378 B1 | 4/2001 | Oertley et al. |
| 6,234,590 B1 | 5/2001 | Satzler |
| 6,241,327 B1 | 6/2001 | Gleasman et al. |
| 6,247,547 B1 | 6/2001 | Lemke et al. |
| 6,250,726 B1 | 6/2001 | Burdick et al. |
| 6,276,768 B1 | 8/2001 | Miller |
| 6,322,473 B1 | 11/2001 | Burdick et al. |
| 6,354,391 B1 * | 3/2002 | Cormican .................. 180/193 |
| 6,425,450 B1 | 7/2002 | Lansberry |
| 6,435,291 B2 | 8/2002 | Lemke et al. |
| 6,435,292 B2 | 8/2002 | Lemke et al. |
| 6,497,460 B2 | 12/2002 | Lemke et al. |
| 6,715,575 B2 | 4/2004 | Karpik |
| 6,904,986 B2 | 6/2005 | Brazier |
| 2004/0045747 A1 | 3/2004 | Albright et al. |
| 2005/0011696 A1 | 1/2005 | Bares et al. |

FOREIGN PATENT DOCUMENTS

| | | |
|---|---|---|
| JP | 10194169 A | 7/1998 |

* cited by examiner

SUSPENSION SYSTEM FOR TRACK VEHICLE

BACKGROUND

The present invention relates to a suspension system for a track vehicle.

SUMMARY

In one embodiment, the invention provides a suspension system for a track vehicle, the suspension system comprising: a frame; a track surrounding the frame; a plurality of suspension modules resiliently interconnected between the frame and track to bias the track into engagement with a ground surface upon which the track vehicle sits; and at least one idler over which the track extends. Under a normal load, all weight of the track vehicle is borne by the suspension modules and not by the at least one idler. Under selected conditions the at least one idler bears at least some weight of the track vehicle to rigidify the track vehicle suspension during such selected conditions.

The suspension system may be embodied in a construction vehicle, and the selected conditions may include applying vertical forces (e.g., arising from digging and lifting) to the construction vehicle. In some embodiments, the suspension modules may include stop blocks rigidly mounted to the frame, biasing assemblies mounted to the stop blocks, and rollers mounted to the biasing assemblies such that all weight of the vehicle under normal load is transferred through the biasing assemblies to the ground through the track. In some embodiments, each suspension module may be designed to bottom out on the stop block of another suspension module under sudden dynamic loading.

In another embodiment, the invention provides a method of suspending a construction vehicle having a track frame and a track surrounding the track frame, the track having first and second opposite sides. The method comprises the steps of mounting at least one idler to the track frame and extending the track around the idler. The method also comprises interposing a plurality of suspension modules between the track frame and the track, each suspension module including a stop block rigidly mounted to the track frame, a roller in contact with the track, and a biasing assembly between the roller and the track frame. The method also comprises biasing the rollers against the first side of the track with the biasing assembly to maintain substantially constant contact between the second side of the track and a ground surface; supporting the entire weight of the vehicle with the suspension modules under a normal load; and supporting at least some of the weight of the vehicle with the idler under selected conditions to rigidify the vehicle suspension.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
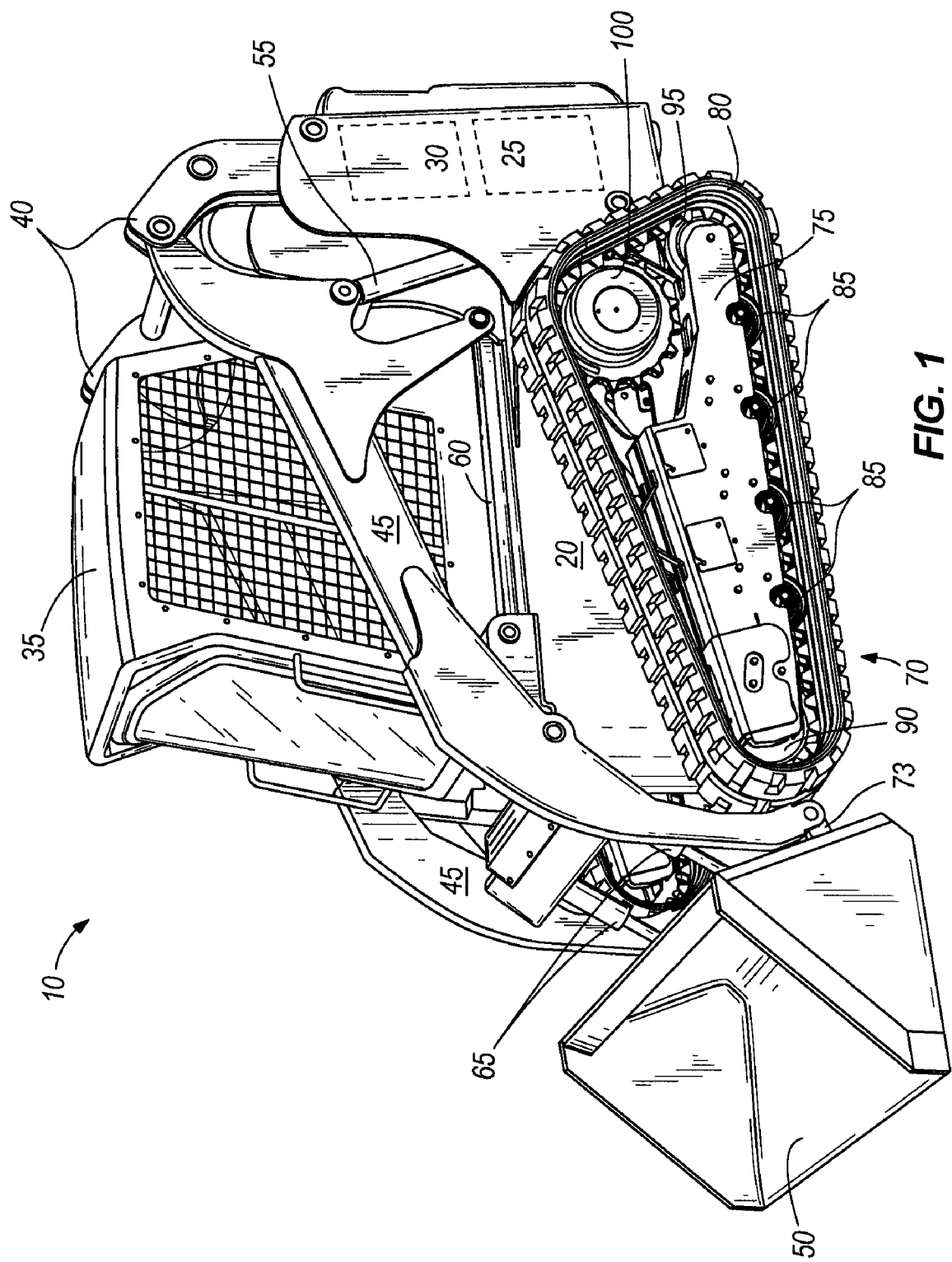
FIG. 1 is a perspective view of a compact track vehicle with a suspension system according to one embodiment of the invention.

FIG. 1 illustrates a compact track loader 10 utilizing a suspension system according to one embodiment of the invention. Although the invention is illustrated as embodied in a compact track loader 10, it may also be embodied in other track vehicles. The compact track loader 10 includes a body frame 20, an engine 25, a hydraulic system 30, a cab 35, a pair of support arms 40, a pair of lift arms 45, a bucket 50, a pair of lift actuators 55, a pair of support links 60, a pair of attachment actuators 65, and a pair of track assemblies 70 (one on each of the opposite sides of the compact track loader 10) that include the suspension system.

The engine 25 drives the hydraulic system 30, which provides pressurized hydraulic fluid to the actuators 55, 65, and the track assembly 70. The operator controls the hydraulic system 30, and therefore operates the compact track loader 10, with controls in the cab 35. The support arms 40 are pivotably mounted to the body frame 20, the lift arms 45 are pivotably mounted to the support arms 40, and an attachment interface 73 is pivotably mounted to the lift arms 45. The lift actuators 55 are interconnected between the lift arms 45 and the body frame 20 and extend and retract in response to the operator's control of the hydraulic system 30 to cause the lift arms 45 to pivot in raising and lowering directions with respect to the support arms 40 and body frame 20. The support links 60 are pivotably mounted between the body frame 20 and each lift arm 45 to provide additional support and stability to the lift arms 45.

The attachment actuators 65 are interconnected between the lift arms 45 and the attachment interface 73, and extend and retract in response to the operator's control of the hydraulic system 30 to pivot the bucket 50 in curling and dumping directions with respect to the lift arms 45. Although the illustrated attachment is a bucket 50, the compact track loader 10 may in other embodiments include other attachment, including without limitation, augers, jack hammers, trenchers, grapples, rotary sweepers, stump grinders, saws, concrete mixers, pumps, chippers, snow throwers, rotary cutters, and backhoes. With other attachments, the attachment cylinders 65 may be used to raise, lower, tilt, or pivot the attachments for their intended purposes.

Each track assembly 70 includes a track frame 75, a track 80, a plurality (e.g., four in the illustrated embodiment) of suspension modules 85 that together define the suspension system, a front idler 90, a rear idler 95, and a drive roller or sprocket 100. The track 80 extends around the track frame 75, and is in contact with the suspension modules 85, front idler 90, rear idler 95, and drive sprocket 100. The hydraulic system 30 is operable to drive rotation of the sprocket 100 of the track assemblies 70 to cause the tracks 80 on each side to rotate around the track frames 75, and thereby cause movement of the compact track loader 10.

The suspension modules 85 resiliently interface between the track frame 75 and the track 80 such that the compact track loader 10 rides on the suspension modules 85 and not the idlers 90, 95 during normal operation. As used herein, "normal load" means that the compact track loader 10 is carrying its own weight, is carrying a load insufficient to bottom out the suspension modules 85, or is operating in a mode that does not cause the compact track loader 10 to rock forward or back onto the front and rear idlers 90, 95.

Figure 2:
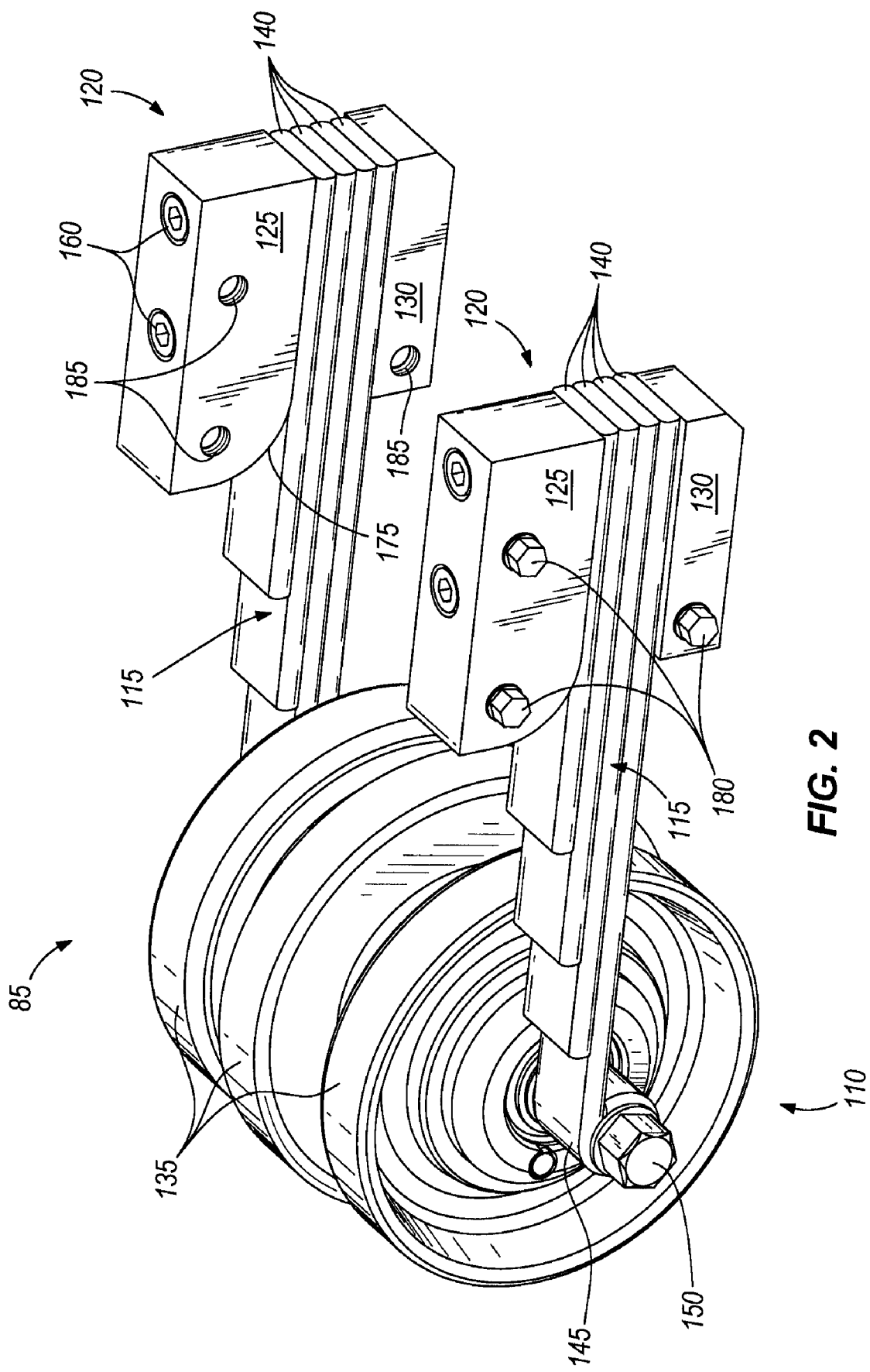
FIG. 2 is a perspective view of a suspension module of the suspension system.
Figure 3:
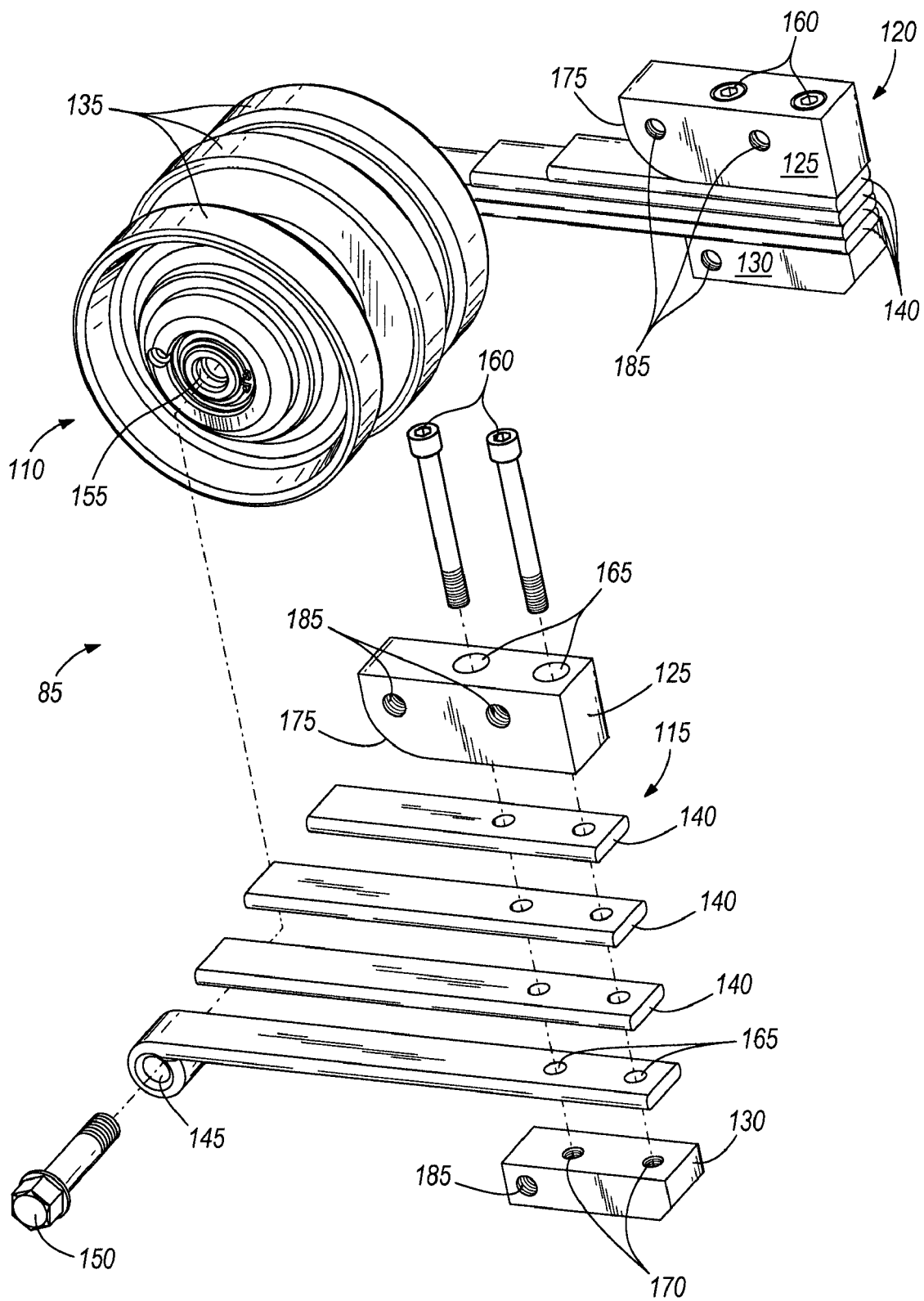
FIG. 3 is a partially exploded view the suspension module.

With reference to FIGS. 2 and 3, each suspension module 85 includes a roller 110, a biasing assembly 115 on either side of the roller 110, and a pair of two-piece stop blocks 120 having upper and lower portions 125, 130. The roller 110 has three track-engaging surfaces 135 that roll along a back side of the track 80 that is opposite a front side of the track 80 that engages the ground.

Each biasing assembly 115 includes a series of stepped leaf springs 140, each having first and second ends. The leaf springs 140 within each biasing assembly 115 are arranged in a progressively lengthening stack, with the first ends of the leaf springs 140 defining steps and the second ends being generally vertically aligned. The first end of the longest leaf spring 140 in each biasing assembly includes a spring eyelet 145 through which a bolt 150 extends. The bolts 150 thread into opposite ends of a roller axle 155 (FIG. 3) about which the roller 110 rotates, and thereby interconnect the roller 110 and the biasing assemblies 115.

Although the illustrated biasing assemblies 115 include four leaf springs 140, it is contemplated that any plurality, or even a single leaf spring 140 may be used. Although in the illustrated embodiment the longest leaf spring 140 is positioned on the bottom of the stack, in other embodiments, the leaf springs 140 may be stacked in other orders. Also, although the second ends of the leaf springs 140 are illustrated in vertical alignment, the second ends may in other embodiments not be vertically aligned.

The biasing assemblies 115 are secured between the upper and lower portions 125, 130 of an associated stop block 120 with a first group of fasteners 160 that extend through holes 165 in the upper portion 125 of the stop block 120 and the leaf springs 115, and thread into threaded holes 170 in the lower portion 130 of the stop block 120. The upper portion 125 includes an arcuate surface 175 against which the top leaf spring 140 deflects. The arcuate profile 175 reduces stress concentrations on the leaf springs 140.

The suspension modules 85 are secured to the track frame 75 with a second group of fasteners 180 that extend through holes in the track frame 75 and thread into threaded holes 185 in the upper portion 125 and lower portion 130 of the respective stop blocks 120. The track frame 75 is sandwiched between the heads of the fasteners 180 and the stop blocks 120. The second group of fasteners 180 is generally perpendicular to the first group of fasteners 160. The first and second groups of fasteners 160, 180 may include any suitable fasteners such as bolts, rivets, nails, screws, and the like, or may be replaced by using another means for rigidly affixing such as welding. A combination of welding and fasteners may be used, for example in securing the stop blocks 120 to the track frame 75. For example, one of the upper and lower portions 125, 130 of the stop blocks 120 may be welded to the track frame 75 and the other portion secured to the welded portion with bolts that extend through the leaf springs 140. With the stop blocks 120 rigidly secured to the track frame 75, the suspension modules 85 transfer all weight of the compact track loader 10 under normal loading through the biasing assemblies 115 to the ground through the track 80.

Figure 4:
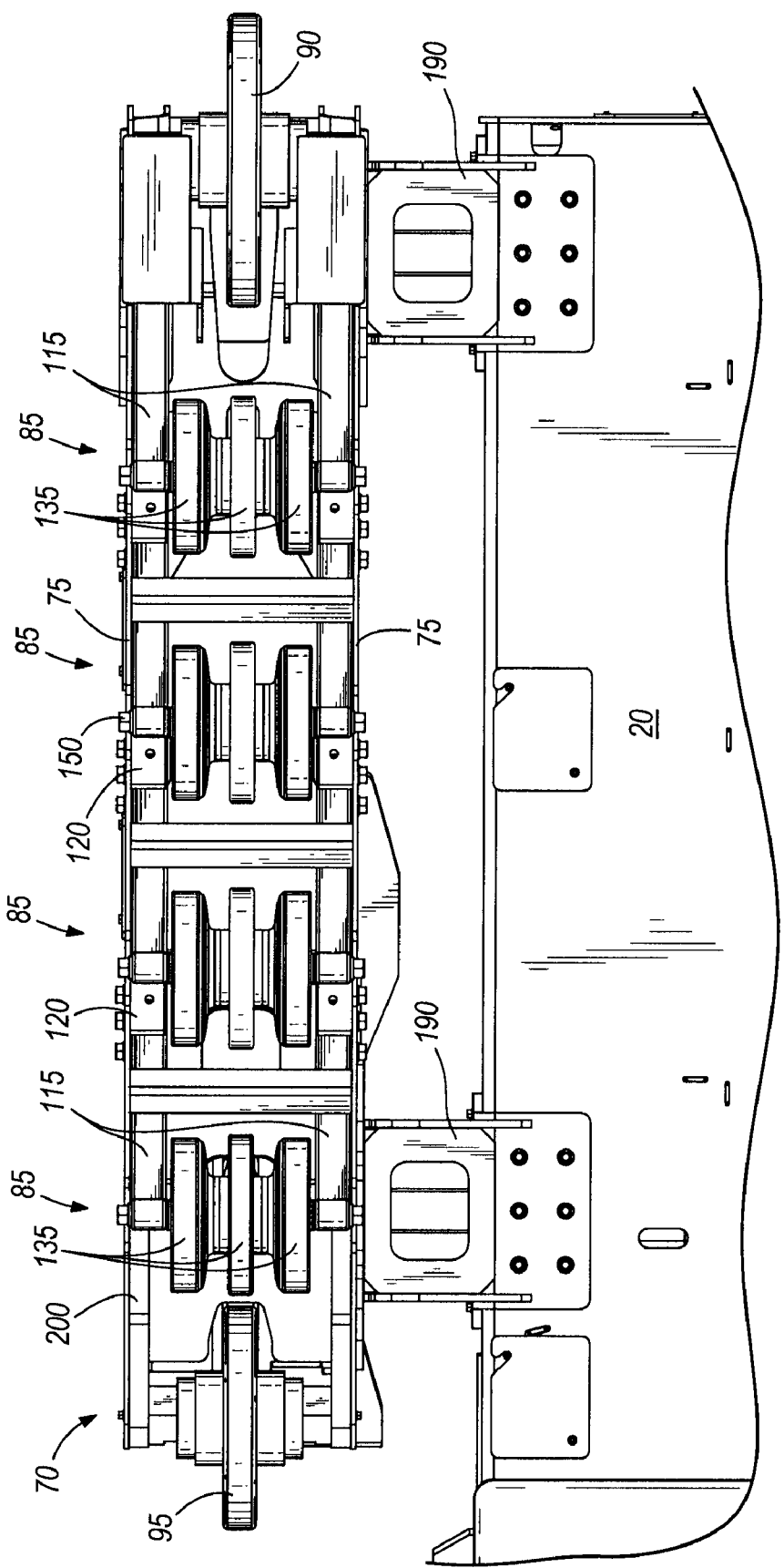
FIG. 4 is a partial bottom view of the compact track vehicle with the track removed for clarity.
Figure 5:
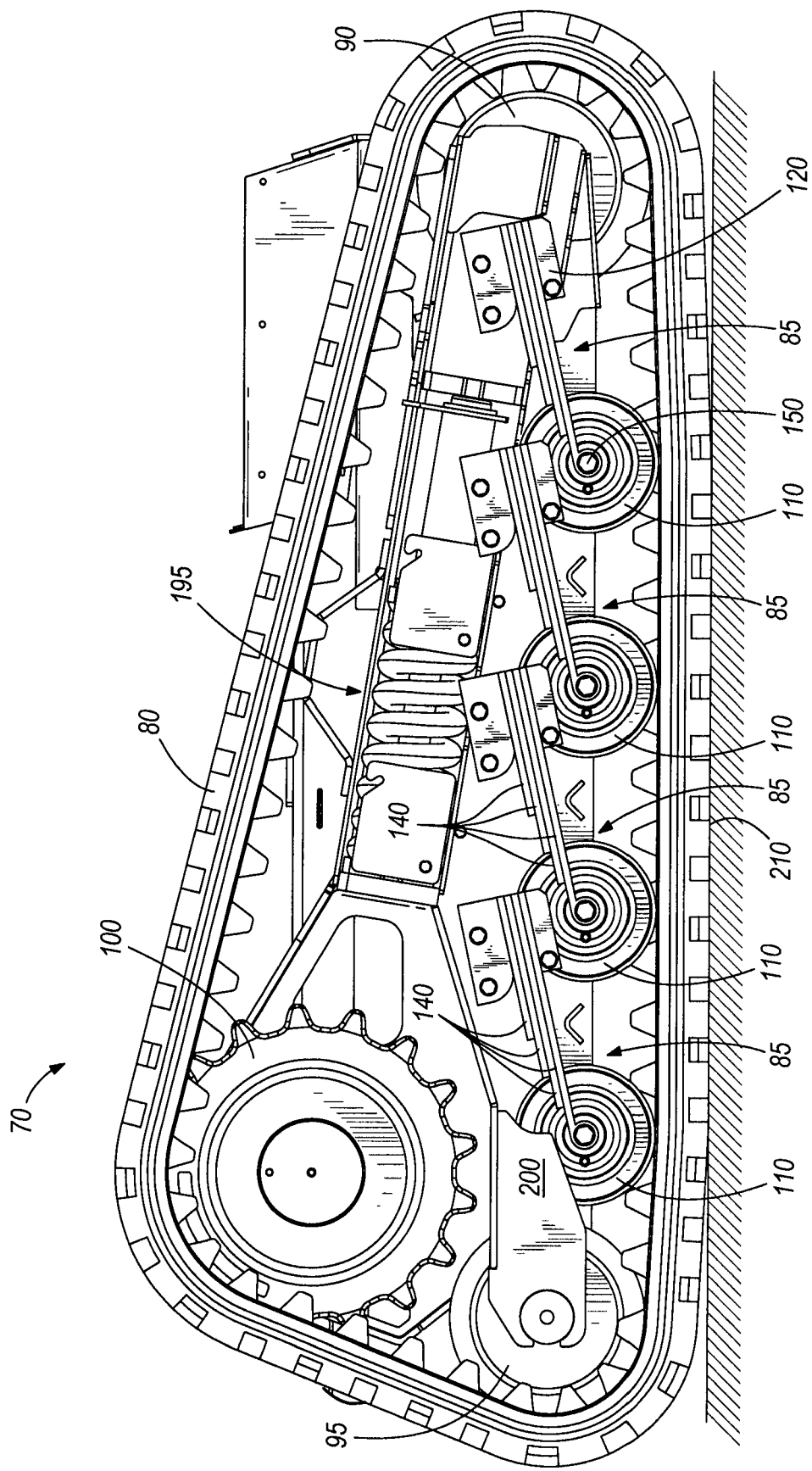
FIG. 5 is a side view of the suspension system with an outside portion of the track frame removed for clarity.

With reference to FIGS. 4 and 5, there are four suspension modules 85 in generally linear alignment within each track assembly 70 of the illustrated embodiment. In other embodiments, more or fewer suspension modules 85, whether in linear or non-linear alignment, may be employed. The track frame 75 of each track assembly 70 is rigidly mounted to the body frame 20 by way of brackets 190 that are bolted, welded, riveted, or otherwise rigidly affixed to the track and body frames 75, 20. The front and rear idlers 90, 95 are rotatable with respect to the track frame 75. The axis of rotation of the rear idler 95 is fixed with respect to the track frame 75, but the front idler 90 is mounted to a shock system 195 that permits linear travel of the front idler 90 with respect to the track frame 75 to accommodate, absorb, and dampen impact of the loader 10 with objects while traveling and ingesting debris between the back side of track 70 and rollers, idlers and sprocket 110, 90, 95 and 100.

In the illustrated arrangement of suspension modules 85, the stop blocks 120 of each suspension module 85 are positioned above the eyelets 145 and bolts 150 of the next suspension module 85. A rear stop block 200 is rigidly mounted to the track frame 75 above the eyelets 145 and bolts 150 of the rearmost suspension module 85.

The suspension system is designed to "bottom out" under certain conditions. A suspension module 85 is said to "bottom out" when the roller 110 is driven upward a sufficient distance to cause the eyelets 145 to abut the stop block 120 of another suspension module 85 or the rear stop block 200. This may occur under sudden, dynamic loading of a suspension module 85 arising from, for example, the compact track loader 10 driving quickly over a rock, curb, or other hard object. The suspension modules 85 are designed to bottom out under such conditions to provide a practical end point for the suspension system, stabilize the suspension system by limiting wild oscillation of the biasing assemblies 115, and limit potential damage to the biasing assemblies 115.

Figure 6:
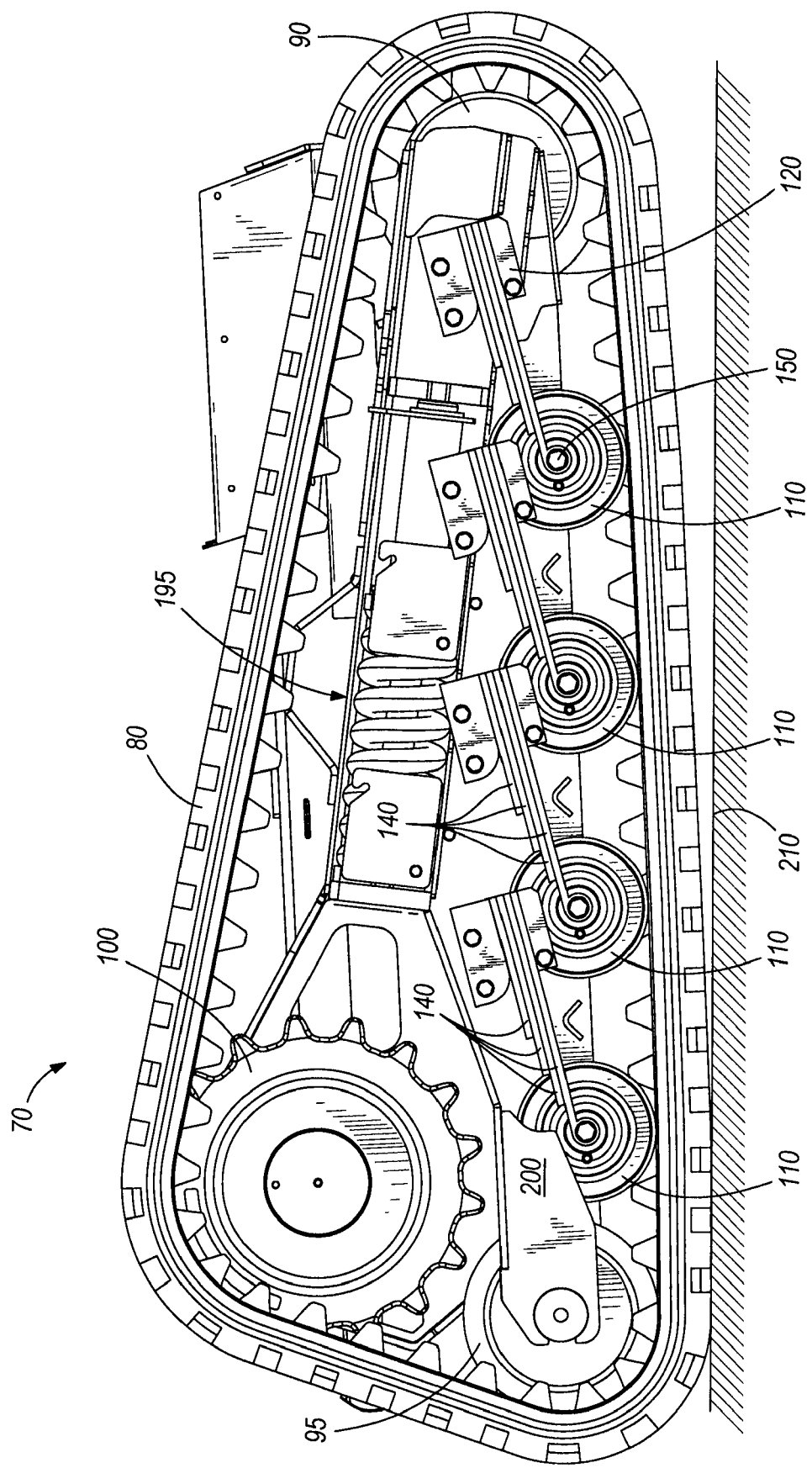
FIG. 6 is a side view of the suspension system rocked onto the rear idler.
Figure 7:
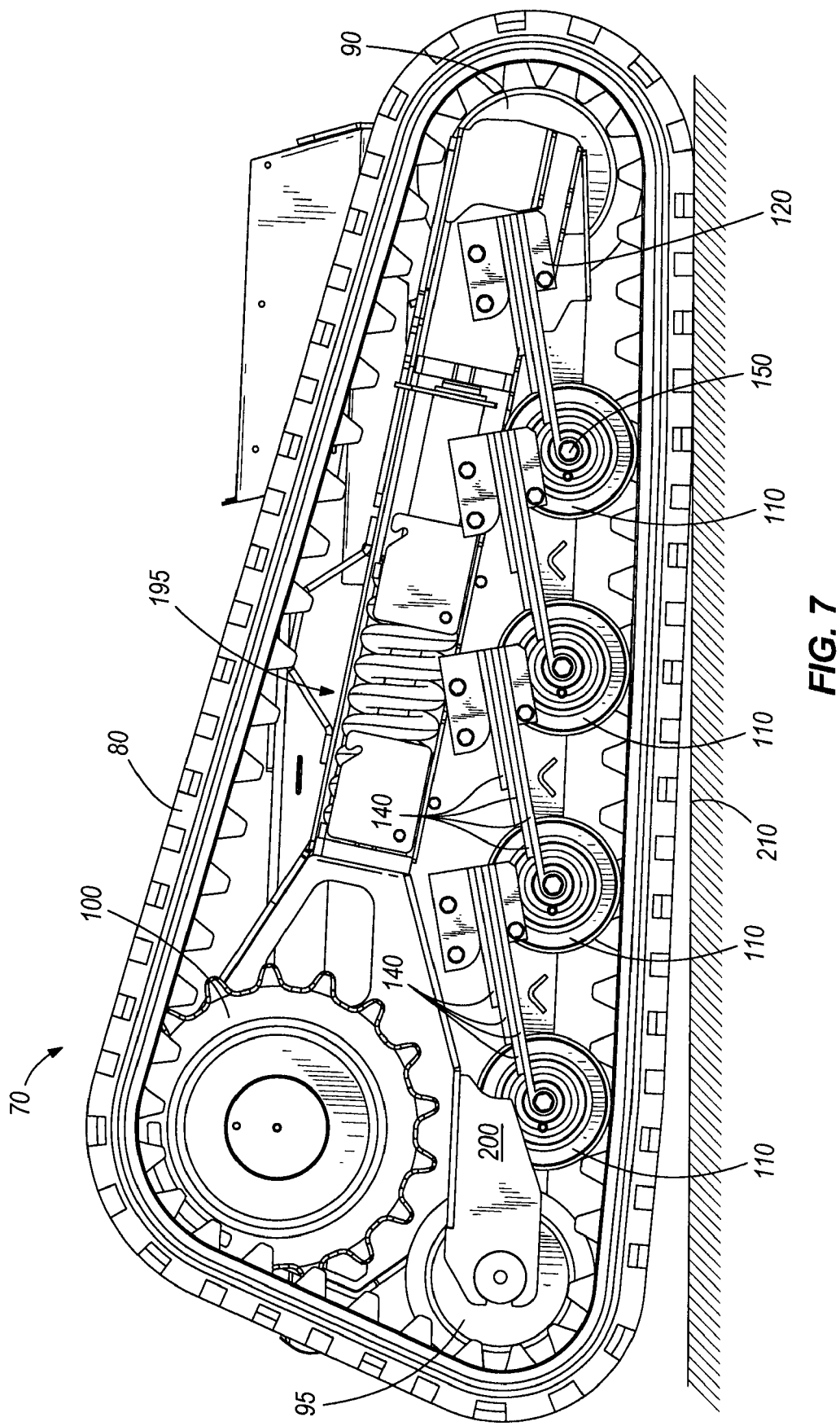
FIG. 7 is a side view of the suspension system rocked onto the front idler.
Figure 8:
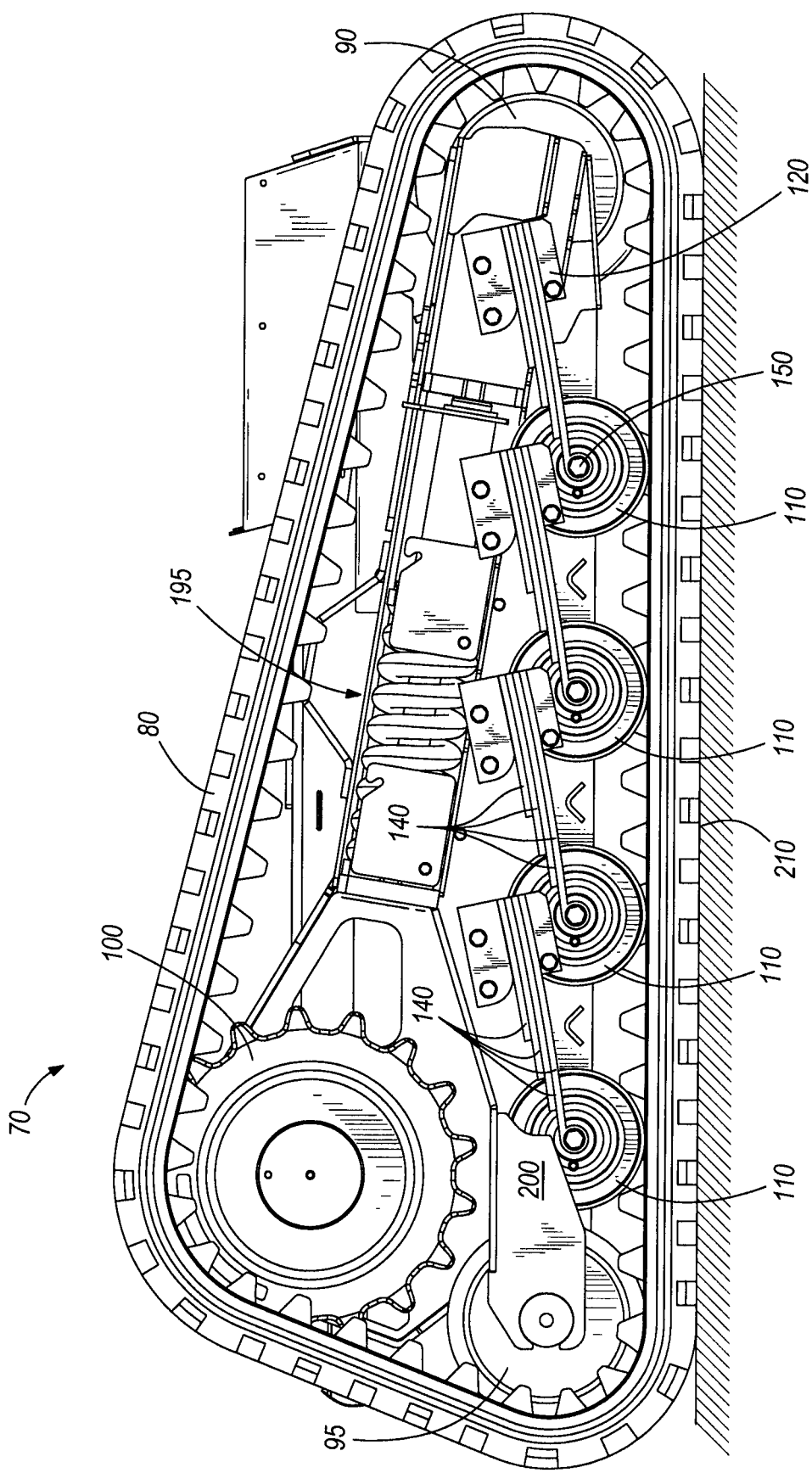
FIG. 8 is a side view of the suspension system with both the front and rear idlers supporting the vehicle.

The idlers 90, 95 are said to "bottom out" when the vehicle's weight is borne by the idlers 90, 95, as illustrated in FIGS. 6, 7, and 8. The situation illustrated in FIG. 6 arises when the attachment is used to push down on the ground 210 in front of the compact track loader 10 such that the front end of the compact track loader 10 is raised and the rear of the compact track loader 10 comes to rest entirely on the rear idlers 95 of the track assemblies 70, or on the rear idlers 95 and one or two of the rear rollers 110. This occurs when the bucket 50 is used to dig down into the earth and the compact track loader 10 rides up to apply the vehicle weight down through the bucket 50. This may also occur when the attachment is a jackhammer, stump grinder, or other attachment that the operator drives against the ground 210.

The situation illustrated in FIG. 7 arises when the attachment bears a great load that causes the compact track loader 10 to rock forward onto the front idlers 90 of the track assemblies 70. This may occur, for example, when the compact track loader 10 is attempting to lift a large load with the attachment. In such case, the entire weight of the compact track loader 10 and load may be borne by the front idlers 90 or by the front idlers 90 along with one or two of the rollers 110. Thus, the situations illustrated in FIGS. 6 and 7 may arise from the compact track loader 10 bearing a large vertical force (directed either generally upwardly or generally downwardly) at the front end of the compact track loader 10.

The situation illustrated in FIG. 8 arises when the compact track loader 10 is exposed to severe loading that deflects all suspension modules 85 to the point where both the front and rear idlers 90, 95 bear some of the weight of the compact track loader 10. This may occur if the compact track loader 10 was carrying a very heavy, centrally-positioned load or if the compact track loader 10 were to drop straight down off a bump while traveling.

In each situation illustrated in FIGS. 6, 7, and 8, the idlers 90, 95 provide a more stable base from which the compact track loader 10 may perform its desired operation than if the suspension system was designed to not bottom out on the idlers 90, 95. For example, the operator is better able to perform work, such as digging and lifting with the lift assembly (e.g., lift arms 45 and bucket 50), when such work is executed with the front and/or rear idler 90, 95 applying a reactive force against then ground 210, than if the more resilient suspension modules 85 were providing the reactive force. In this regard, the idlers 90, 95 may be said to rigidify the suspension of the compact track loader 10 under selected conditions in which the suspension system bottoms out on the idlers 90, 95.

In one example of a compact track loader 10 according to the present invention, the leaf springs 140 are constructed of SAE 5160 spring steel having 0.401" thickness and 1.75" width. The leaf springs 140 may be designed such that application of the weight of the compact track loader 10 (i.e., the "off-jack vehicle weight") to the suspension modules 85 causes the springs 140 to deflect sufficiently to lower the vehicle a first amount equal to about 7/16". The suspension modules 85 may also be designed, for example, to bottom out upon an additional deflection of the springs 140 resulting the vehicle lowering a second amount (i.e., the range of motion of the vehicle suspension during use) equal to about 9/16". Thus, the total range of motion for such an arrangement from totally unloaded to bottoming out would be about one inch. This example is by no means limiting of the invention and is provided as an example of one possible embodiment only.

Various features and advantages of the invention are set forth in the following claims.

What is claimed is:

1. A suspension system for a track vehicle, the suspension system comprising:
 a frame;
 a track surrounding the frame;
 a plurality of suspension modules resiliently interconnected between the frame and track to bias the track into engagement with a ground surface upon which the track vehicle sits, one suspension module including a stop block rigidly mounted to the frame such that another suspension module bottoms out against the stop block under sudden dynamic loading; and
 at least one idler over which the track extends;
 wherein under a normal load, all weight of the track vehicle is borne by the suspension modules and not by the at least one idler; and
 wherein under selected conditions the at least one idler bears at least some weight of the track vehicle to rigidify the track vehicle suspension during such selected conditions.

2. The suspension system of claim 1, wherein the selected conditions include a vertical force being applied to an end of the track vehicle.

3. The suspension system of claim 1, wherein the at least one idler is mounted for rotation about an axis of rotation that is fixed with respect to the frame.

4. The suspension system of claim 1, wherein each suspension module includes a roller and at least one biasing assembly interconnecting the roller to the frame; wherein the roller of each suspension module rolls along a back side of the track opposite a front side of the track that is in engagement with the ground surface; and wherein the biasing assemblies bias the track into engagement with the ground surface through the rollers.

5. The suspension system of claim 1, wherein each suspension module includes a stop block rigidly affixed to the frame and at least one leaf spring mounted to the stop block and transferring the weight of the vehicle from the frame to the track; and wherein the stop block includes an arcuate surface to reduce stress concentration on the leaf spring upon deflection of the leaf spring.

6. The suspension system of claim 1, wherein each suspension module includes a biasing assembly and a stop block having first and second portions; wherein at least one first fastener tightens the first and second portions of the stop block against opposite sides of the biasing assembly; and wherein at least one second fastener extends generally perpendicular to the at least one first fastener to rigidly secure the stop block to the frame.

7. A construction vehicle comprising:
 a body frame;
 an internal combustion engine supported by the body frame;
 a hydraulic system operable under the influence of the internal combustion engine;
 a lift arm assembly operable under the influence of the hydraulic system to perform work; and
 a track assembly including a track frame, a track movable under the influence of the hydraulic system with respect to the track frame to move the vehicle, at least one idler over which the track extends, and a plurality of suspension modules resiliently mounted between the track frame and the track, one suspension module including a stop block rigidly mounted to the track frame such that another suspension module bottoms out against the stop block under sudden dynamic loading;
 wherein under a normal load, all weight of the track vehicle is borne by the suspension modules and not by the at least one idler; and
 wherein, in response to the lift arm assembly performing work under selected conditions, the at least one idler bears at least some weight of the track vehicle to rigidify the track vehicle suspension to facilitate the performance of such work.

8. The construction vehicle of claim 7, wherein the selected conditions include a vertical force being applied to an end of the construction vehicle.

9. The construction vehicle of claim 7, wherein the at least one idler is mounted for rotation about an axis of rotation that is fixed with respect to the track frame.

10. The construction vehicle of claim 7, wherein each suspension module includes a roller and at least one biasing assembly interconnecting the roller to the track frame;

wherein the roller of each suspension module rolls along a back side of the track opposite a front side of the track that is in engagement with the ground surface; and wherein the biasing assemblies bias the track into engagement with the ground surface through the rollers.

11. The construction vehicle of claim 7, wherein each suspension module includes a stop block rigidly affixed to the track frame and at least one leaf spring mounted to the stop block and transferring the weight of the construction vehicle from the track frame to the track; and wherein the stop block includes an arcuate surface to reduce stress concentration on the leaf spring upon deflection of the leaf spring.

12. The construction vehicle of claim 7, wherein each suspension module includes a biasing assembly and a stop block having first and second portions; wherein at least one first fastener tightens the first and second portions of the stop block against opposite sides of the biasing assembly; and wherein at least one second fastener extends generally perpendicular to the at least one first fastener to rigidly secure the stop block to the track frame.

13. A method of suspending a construction vehicle having a track frame and a track surrounding the track frame, the track having first and second opposite sides, the method comprising the steps of:

mounting at least one idler to the track frame and extending the track around the idler, comprising mounting a first idler for rotation with respect to the frame about an axis of rotation that is fixed with respect to the frame, and mounting a second idler for rotation with respect to the frame about a second axis of rotation, and interposing a shock absorber between the track frame and second idler to permit movement of the second axis of rotation with respect to the track frame;

interposing a plurality of suspension modules between the track frame and the track, each suspension module including a stop block rigidly mounted to the track frame, a roller in contact with the track, and a biasing assembly between the roller and the track frame;

biasing the rollers against the first side of the track with the biasing assembly to maintain substantially constant contact between the second side of the track and a ground surface;

supporting the entire weight of the vehicle with the suspension modules under a normal load; and supporting at least some of the weight of the vehicle with the idler under selected conditions to rigidify the vehicle suspension.

14. The method of claim 13, wherein supporting at least some of the weight of the vehicle with the idler includes rocking the construction vehicle onto one of the first and second idlers in response to a vertical force being applied to an end of the track vehicle.

15. The method of claim 13, wherein each suspension module includes a stop block mounted to a portion of the biasing assembly; and wherein interposing a plurality of suspension modules includes rigidly affixing the stop blocks to the track frame; the method further comprising bottoming out at least one suspension module against the stop block of another suspension module under sudden, dynamic loading.

16. The method of claim 13, wherein each suspension module includes a stop block mounted to a portion of the biasing assembly; and wherein interposing a plurality of suspension modules includes securing the stop block to the biasing assembly with at least one first fastener, and securing the stop block to the track frame with at least one second fastener perpendicular to the at least one first fastener.

* * * * *